(12) United States Patent
Wittmann et al.

(10) Patent No.: US 11,567,738 B2
(45) Date of Patent: Jan. 31, 2023

(54) CODE GENERATOR FOR CREATING A UNIFIED DATA MODEL FOR MULTIPLE LANGUAGE SPECIFICATIONS

(71) Applicant: Red Hat, Inc., Raleigh, NC (US)

(72) Inventors: Eric Wittmann, Hartford, CT (US); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/231,678

(22) Filed: Apr. 15, 2021

(65) Prior Publication Data

US 2022/0334810 A1 Oct. 20, 2022

(51) Int. Cl.
G06F 9/44 (2018.01)
G06F 8/35 (2018.01)
G06F 8/10 (2018.01)

(52) U.S. Cl.
CPC .................. G06F 8/35 (2013.01); G06F 8/10 (2013.01)

(58) Field of Classification Search
CPC ........................................................ G06F 8/35
USPC ........................................................ 717/106
See application file for complete search history.

(56) References Cited

U.S. PATENT DOCUMENTS

| | | | |
|---|---|---|---|
| 7,895,568 B1 | 2/2011 | Goodwin et al. | |
| 8,473,896 B2 | 6/2013 | Brunswig et al. | |
| 8,856,735 B2 * | 10/2014 | Nimashakavi | G06F 16/972 |
| | | | 717/106 |
| 8,893,077 B1 * | 11/2014 | Aiuto | G06F 8/36 |
| | | | 717/106 |
| 9,916,137 B2 * | 3/2018 | Chouhan | H04L 67/02 |
| 9,959,198 B1 * | 5/2018 | Jha | G06F 11/3684 |
| 10,324,690 B2 | 6/2019 | Ouali | |
| 10,545,730 B2 * | 1/2020 | McCune | G06F 8/30 |
| 10,866,788 B2 * | 12/2020 | Reddy | G06F 9/54 |
| 10,866,803 B2 * | 12/2020 | Callahan | G06F 8/73 |
| 10,908,971 B1 * | 2/2021 | Gonzalez | G06F 8/41 |
| 11,113,097 B2 * | 9/2021 | Gujarathi | H04L 63/00 |
| 11,126,408 B2 * | 9/2021 | Mair | G06F 9/3836 |
| 11,237,883 B2 * | 2/2022 | MacLeod | G06F 8/71 |

(Continued)

OTHER PUBLICATIONS

L. Baresi, D. F. Mendonça, M. Garriga, S. Guinea, and G. Quattrocchi. 2019. "A Unified Model for the Mobile-Edge-Cloud Continuum". ACM Trans. Internet Technol. 19, 2, Article 29 (Mar. 2019), 21 pages.*

(Continued)

*Primary Examiner* — Francisco J Aponte
(74) *Attorney, Agent, or Firm* — K&L Gates LLP

(57) ABSTRACT

A system, includes a memory and a processor, where the processor is in communication with the memory. The processor is configured to receive a request to generate source code associated with a unified model defined by a set of specifications. A first specification of the set of specifications is parsed into a first set of components and a second specification of the set of specifications is parsed into a second set of components. The first set of components and the second set of components are analyzed to determine a correlation set and groups within the first set of components and the second set of components. The first set of components and the second set of components, incorporating the correlation set and groups, are combined to generate the unified model. The source code associated with the unified model is generated.

17 Claims, 6 Drawing Sheets

(56) References Cited

U.S. PATENT DOCUMENTS

| | | | |
|---|---|---|---|
| 11,237,889 B1* | 2/2022 | Ma | G06F 9/548 |
| 11,422,777 B2* | 8/2022 | Schmitt | G06F 8/458 |
| 2011/0153590 A1* | 6/2011 | Chang | G06F 16/958 |
| | | | 707/711 |
| 2015/0295983 A1* | 10/2015 | Hu | G06F 9/546 |
| | | | 719/329 |
| 2016/0004729 A1* | 1/2016 | Evans | G06F 16/212 |
| | | | 707/803 |
| 2016/0170722 A1* | 6/2016 | Evans | G06F 8/35 |
| | | | 717/104 |
| 2016/0378439 A1* | 12/2016 | Straub | G06F 8/61 |
| | | | 717/107 |
| 2017/0078360 A1* | 3/2017 | Kumar | G06F 16/00 |
| 2018/0024814 A1* | 1/2018 | Ouali | G06F 11/3688 |
| | | | 717/105 |
| 2018/0121320 A1* | 5/2018 | Dolby | G06F 11/00 |
| 2018/0196643 A1* | 7/2018 | Dolby | H04L 67/025 |
| 2019/0132264 A1* | 5/2019 | Jafar Ali | G06F 40/295 |
| 2019/0272169 A1* | 9/2019 | Russell | G06F 8/30 |
| 2020/0226002 A1* | 7/2020 | MacLeod | G06F 9/5072 |
| 2020/0233786 A1* | 7/2020 | Battaglia | G06F 11/3664 |
| 2020/0233787 A1* | 7/2020 | Battaglia | H04L 63/0876 |
| 2020/0233789 A1* | 7/2020 | Battaglia | H04L 67/40 |
| 2020/0387415 A1* | 12/2020 | Take | G06Q 50/10 |
| 2021/0064453 A1* | 3/2021 | Bahrami | G06N 3/0445 |
| 2021/0279115 A1* | 9/2021 | Aspro | G06F 9/541 |
| 2022/0057999 A1* | 2/2022 | Pitchai Muthu | G06F 8/30 |

OTHER PUBLICATIONS

Farzad Sedghi Farooji, "Evaluation of Code Generation Tools", Degree Project in Software Engineering of Distributed Systems KTH Information and Communication Systems Stockholm 2014; https://www.diva-portal.org/smash/get/diva2:871539/FULLTEXT01.pdf; 168 pages; retrieved on or before Feb. 10, 2021.

Saurahb et al., "Maximizing Automatic Code Generation: Using XML based MDA", Computer Science Department, Jaypee University of Information Technology Waknaghat, India; https://www.researchgate.net/publication/289343945_Maximizing_automatic_code_generation_Using_XML_based_MDA; Aug. 2, 2012; 2 pages; retrieved on or before Feb. 10, 2021.

"APIMATIC CodeGen as a Service", https://apimatic.docs.apiary.io/#introduction/working-with-api-descriptions-documents; 4 pages; retrieved on or before Feb. 10, 2021.

"Using OpenAPI to Generate API Ciiem Code", https://phrase.com/blog/posts/using-openapi-to-generate-api-client-code/; 10 pages; retrieved on or before Feb. 10, 2021.

* cited by examiner

US 11,567,738 B2

CODE GENERATOR FOR CREATING A UNIFIED DATA MODEL FOR MULTIPLE LANGUAGE SPECIFICATIONS

BACKGROUND

Computer systems may run applications or services that are provided via a server or cloud. The applications or services can be developed and deployed at runtime. Application instances or services may run within containers, which may be run on physical or virtual machines. The containers may be used to separate various components of a computing system. For example, different components of a computing system may be executed at different containers and/or virtual machines executing on a computing device or multiple computing devices. Maintenance and/or modifications to installed service and/or applications may often be applied in various server or cloud environments which may be continuously evolving.

SUMMARY

The present disclosure provides new and innovative systems and methods for generating source code associated with a unified data model based on multiple language specifications and/or multiple versions of each specification. In an example, a method includes receiving a request to generate source code associated with a unified model defined by a set of specifications. Next, a first specification of the set of specifications is parsed into a first set of components and a second specification of the set of specifications is parsed into a second set of components. The first set of components and the second set of components are analyzed to determine a correlation set and groups within the first set of components and the second set of components. The first set of components and the second set of components, incorporating the correlation set and groups, are combined to generate the unified model. Next, the source code associated with the unified model is generated.

In an example, a system includes a memory and a processor, where the processor is in communication with the memory. The processor is configured to receive a request to generate source code associated with a unified model defined by a set of specifications. A first specification of the set of specifications is parsed into a first set of components and a second specification of the set of specifications is parsed into a second set of components. The first set of components and the second set of components are analyzed to determine a correlation set and groups within the first set of components and the second set of components. The first set of components and the second set of components, incorporating the correlation set and groups, are combined to generate the unified model. Next, the source code associated with the unified model is generated.

In an example, a non-transitory machine readable medium storing code, which when executed by a processor is configured to receive a request to generate source code associated with a unified model defined by a set of specifications. Next, a first specification of the set of specifications is parsed into a first set of components and a second specification of the set of specifications is parsed into a second set of components. The first set of components and the second set of components are analyzed to determine a correlation set and groups within the first set of components and the second set of components. The first set of components and the second set of components, incorporating the correlation set and groups, are combined to generate the unified model. Then the source code associated with the unified model is generated.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

Techniques are disclosed for providing an ability to quickly generate and/or implement source code associated with a unified data model based on multiple language specifications and/or multiple versions of each specification. Typically, applications that read, write, and/or edit documents or files implement one or more specifications (e.g., OpenAPI and/or AsyncAPI) to interact with the documents or files. Generally, specifications define properties and/or structures associated with files and/or documents and each type of specification typically has multiple versions. Traditionally, an application includes a data model created for each version of each specification so that the application is operable to read, analyze, and/or edited documents based on each specification in a structured way. However, often, creating and/or implementing data models associated with each specification requires system and/or application downtime and extensive integration testing to implement any modification to effected specifications.

As described in various examples disclosed herein, to facilitate code generation and/or code sharing of models based on multiple specifications, the systems and methods disclosed herein advantageously generate a class hierarchy (e.g., java classes) based on a model generated from multiple specifications and/or versions of specifications. In various implementations, a unified approach to generating data models may provide a uniform and/or consistent interface for providing consistent processing of documents regardless of which specification is used by each application.

In various implementations, an accurate and easily maintained unified data model may be created by generating implementations of source code based on descriptions of each specification and its versions. For example, a code generator may be operable to read and/or analyze a meta-description of each specification (and its versions) and produce classes and interfaces operable to interact with files associated with each specification. In certain implementations, a code generator may output a unified data model class hierarchy, a visitor interface hierarchy (i.e., a visitor pattern), traverser interface hierarchy (i.e., a traverser pattern), I/O classes (i.e., readers/writers), and/or other requested design patterns. In most instances, a system and/or method of generating source code for a unified model may reduce downtime of applications and/or systems, reduce complexity of maintaining source code, simplify interface integration of new specifications, and provide interface consistency. In many instances, source code associated with various specifications may be maintained and kept up to date by merely maintaining each specification. In these instances, updated models may be created by re-generated source code from update specifications.

Figure 1:
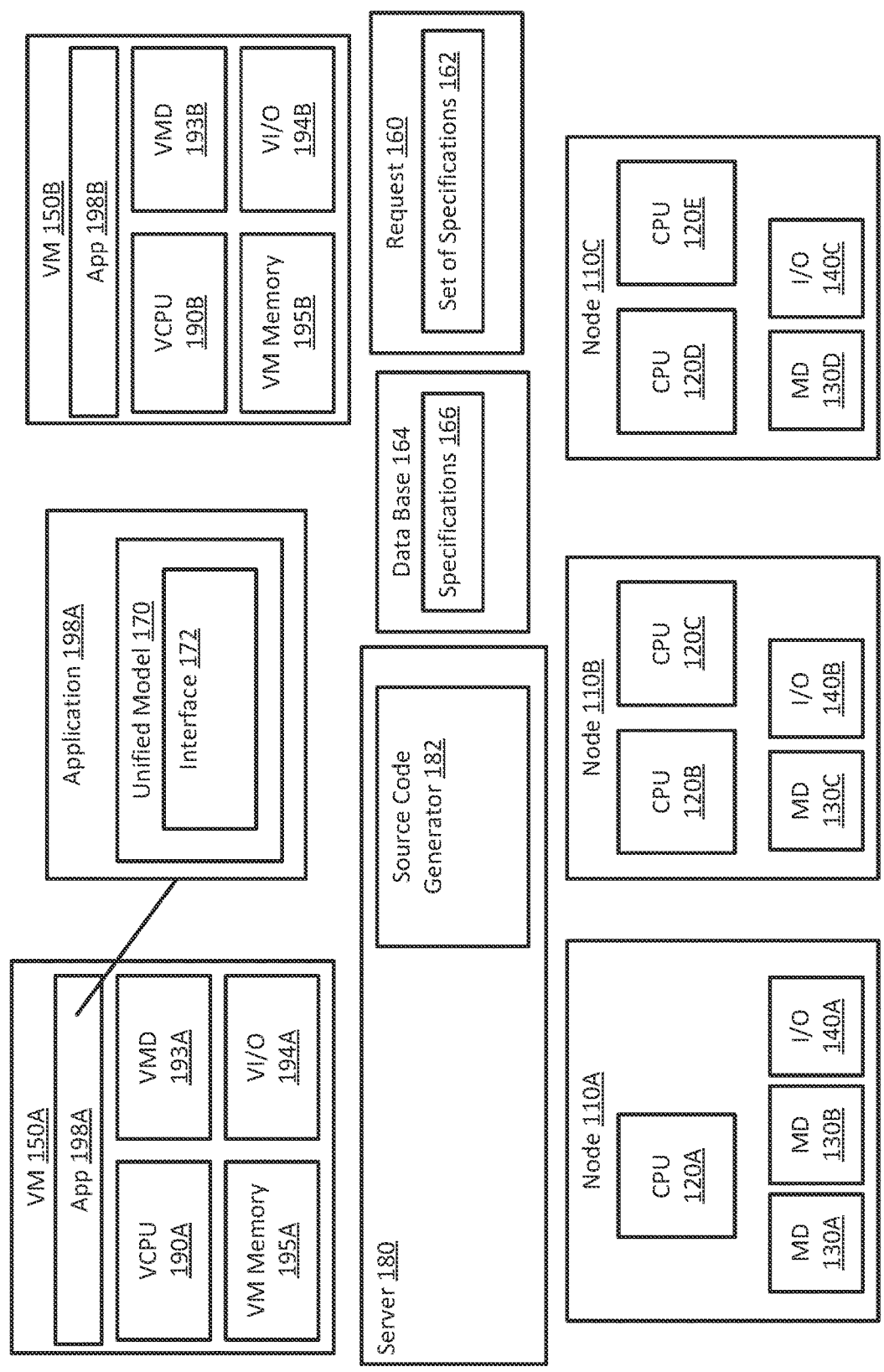
FIG. 1 illustrates a high level component diagram of an example computing system in accordance with one or more aspects of the present disclosure.

FIG. 1 depicts a high-level component diagram of an example computing system 100 in accordance with one or more aspects of the present disclosure. The computing system 100 may include a server 180, database 164, one or more virtual machines (VM 150A-B, 150 generally), and nodes (e.g., nodes 110A-C, 110 generally). The server 180 may include a source code generator 182, which may generate a unified model 170 and interface 172 based on a set of specifications 162. The database 164 may store one or more specifications 166. In various implementations, a source code generator (e.g., source code generator 182) may receive a request (e.g., request 160) to generate source code (e.g., interface 172) associated with a unified model (e.g., unified model 170) derived from a set of specifications (e.g., set of specifications 162). In some implementations, a request 160 may include one or more references which may be used to retrieve a set of specifications 162 from specifications 166 stored within the database 164.

Virtual machines 150A-B may include a virtual machine memory (VM Memory), a virtual CPU (VCPU), virtual memory devices (VMD), and virtual input/output devices (VI/O). For example, virtual machine 150A may include virtual machine memory 195A, a virtual CPU 190A, a virtual memory devices 193A, and a virtual input/output device 194A. Similarly, virtual machine 150B may include virtual machine memory 195B, a virtual CPU 190B, a virtual memory devices 193B, and virtual input/output device 194B. In an example, Applications 198A-B may be different applications or services. In another example, applications 198A-B may be different instances of the same application or service.

In an example, a virtual machine 150A may execute a guest operating system and run applications 198A-B which may utilize the underlying VCPU 190A, VMD 193A, and VI/O device 194A. One or more applications 198A-B may be running on a virtual machine 150A under the respective guest operating system. A virtual machine (e.g., VM 150A-B, as illustrated in FIG. 1) may run on any type of dependent, independent, compatible, and/or incompatible applications on the underlying hardware and operating system ("OS"). In an example, applications (e.g., App 198A-B) run on a virtual machine 150A may be dependent on the underlying hardware and/or OS. In another example embodiment, applications 198A-B run on a virtual machine 150A may be independent of the underlying hardware and/or OS. For example, application 198A run on a first virtual machine 150A may be dependent on the underlying hardware and/or OS while application (e.g., application 198B) run on a second virtual machine (e.g., VM 150B) is independent of the underlying hardware and/or OS. Additionally, applications 198A-B run on a virtual machine 150A may be compatible with the underlying hardware and/or OS. In an example embodiment, applications 198A-B run on a virtual machine 150A may be incompatible with the underlying hardware and/or OS. For example, application 198A run on one virtual machine 150A may be compatible with the underlying hardware and/or OS while applications 198B run on another virtual machine 150B are incompatible with the underlying hardware and/or OS.

In an example, virtual machines 150A-B may instead be containers that execute applications or services, such as microservices. In an example, the containers may each run a process or service and the containers may be any execution environment. For example, the containers may be a virtual server. It should be appreciated that containers may be stand alone execution environments, similar to that of a virtual machine. The applications 198A-B or services (e.g., microservices) may run in a software container or a virtual machine (e.g., virtual machines 150A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 150A-B may be provisioned on the same host or node (e.g., node 110A) or different nodes. For example, VM 150A and VM 150B may both be provisioned on node 110A. Alternatively, VM 150A may be provided on node 110A while VM 150B is provisioned on node 110B.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-E) may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2A:
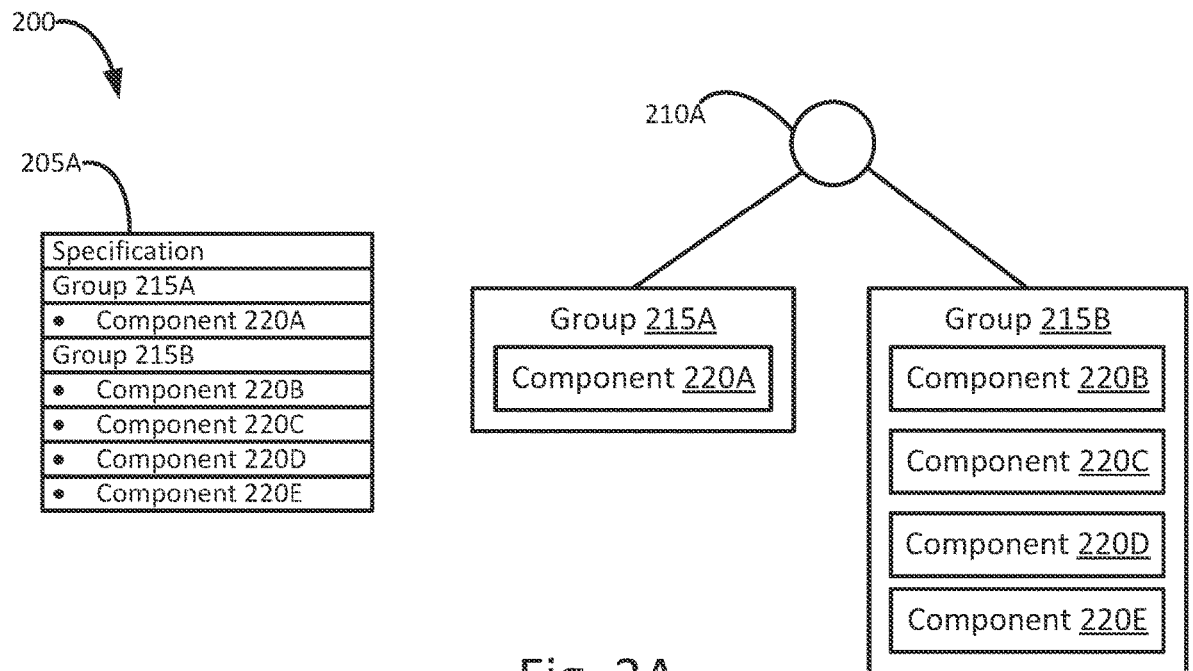
FIGS. 2A, 2B, and 2C show various states of a source code generator creating a unified model from a set of specifications in accordance with one or more aspects of the present disclosure.
Figure 2B:
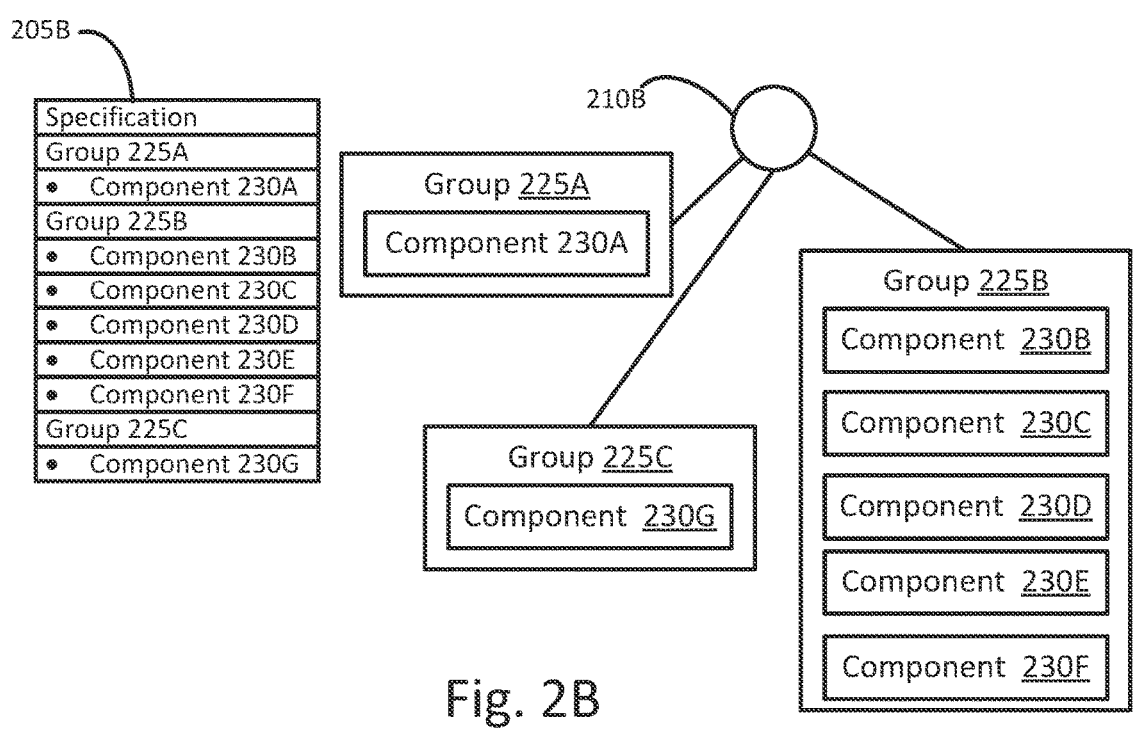
Figure 2C:
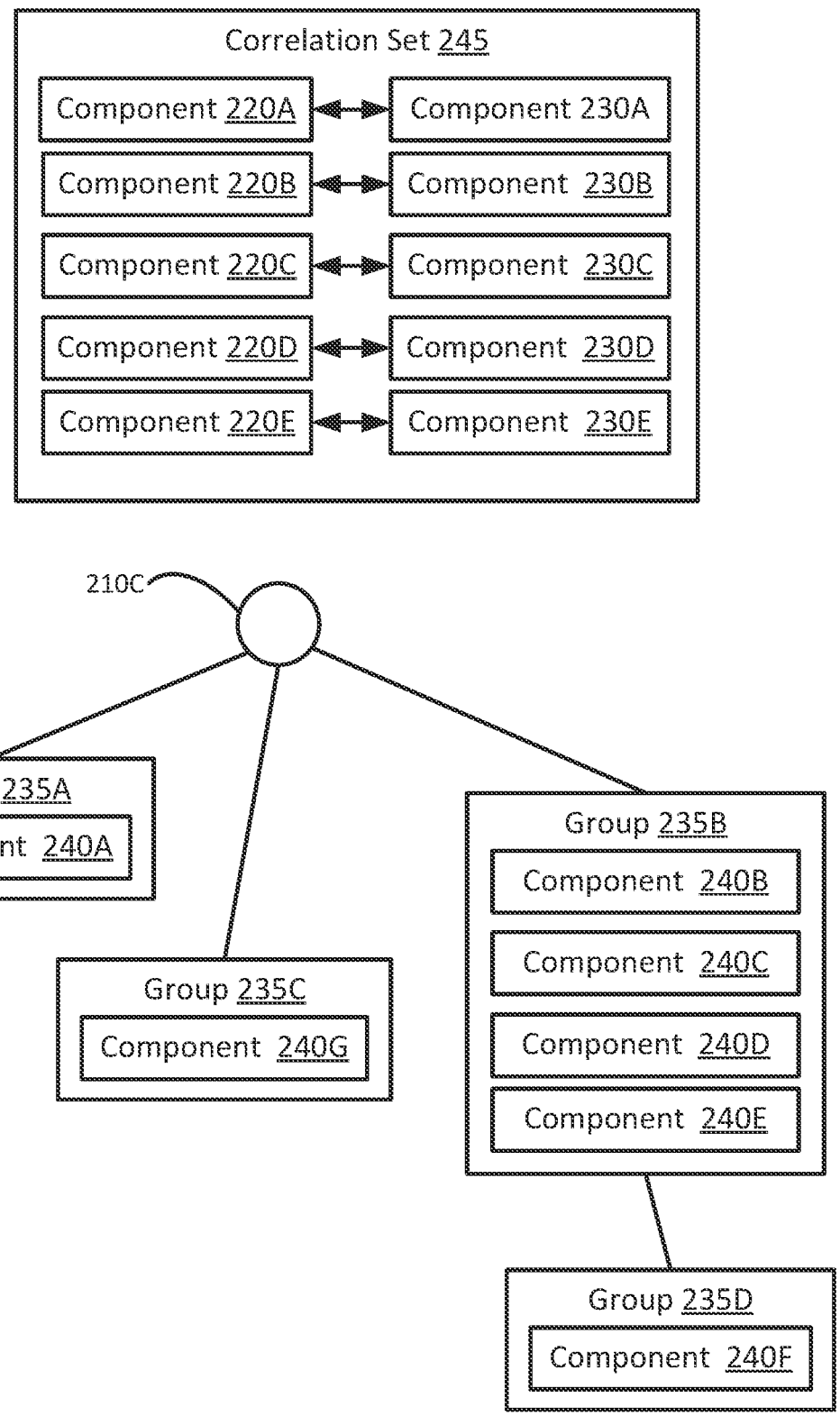

FIGS. 2A, 2B, and 2C show various states of a source code generator creating a unified model from a set of specifications in accordance with one or more aspects of the present disclosure. FIG. 2A shows a first state of a specification 205A being analyzed by source code generator 182 (FIG. 1). As shown in FIG. 2A, specification 205A includes Group 215A and group 215B. In this instance, group 215A includes component 220A while group 215B includes component 220B, component 220C, component 220D, and component 220E. The specification 205A is transformed into model 210A having a common base class and two sub-classes (e.g. group 215A and group 215B) each including one or more components. FIG. 2B shows a second state of a specification 205B being analyzed by source code generator 182 (FIG. 1). As shown in FIG. 2B, specification 205B includes group 225A, group 225B, and group 225C. Group 225A includes component 230A, group 225B includes component 230B, component 230C, component 230D, component 230E, and component 230F, and group 225C includes component 230G. The specification 205B is transformed into model 210B having a common base class and three sub-classes (e.g., group 225A, group 225B, and group 225C). FIG. 2C shows a third state where a source code generator creates a unified model 210C based on a correlation set 245. The correlation set 245 shows which components from specification 205A correlate with components from specification 205B. For example, components 220A, 220B, 220C, 220D, and 220E from specification 205A correlate to components 230A, 230B, 230C, 230D, and 230E from specification 205B.

The combination of states from FIGS. 2A, 2B, and 2C show a progression of analysis and/or combination of specifications (e.g., specifications 205A and 205B) to generate a unified model (e.g., unified model 210C). For example, in one implementation, an application (e.g., application 198A) may require a functionality to operate on multiple versions of a file type (e.g., a text document, a database) or an ability to translate from a first file type to a second file type (e.g., an editor able to save into multiple formats). In this example, a source code generator (e.g., source code generator 182) may receive a request (e.g., request 160) to generate source code (e.g., interface 172) associated with a unified model (e.g., unified model 170 or unified model 210C) based on a specification (e.g., specifications 166, set of specifications 162, specifications 205A-B, 205 Generally). In certain implementations, a source code generator may analyze each received specification (e.g., specification 205A and specification 205B) to determine which components and/or structures are associated and combine the associated components and/or structures into groups (e.g., group 215A, group 215B, group 225A, group 225B, and group 225C). In these implementations, a source code generator (e.g., source code generator 182) may correlate components into a correlation set 245 indicating which components from a first specification (e.g., specification 205A) are equivalent to components from a second specification (e.g., specification 205B). In many implementations, a source code generator may combine components in the correlation set by group. For example, when combining specification (e.g., specification 205A and specification 205B) to generated uniform model (e.g., uniform model 210C), a source code generator may represent a component from each specification with a single component (e.g., component 220A and component 230A is represented by component 240A in the unified model 210C). In other implementations, groups may be added (e.g., group 235D) to a uniform model (e.g., uniform model 210C) when a second specification (e.g., specification 205B) includes more components than a first specification (e.g., specification 205A).

In various implementations, a specification may be a machine-readable description (meta-model) (e.g., OpenAPI, AsyncAPI, JSON schema, AVRO, and, GraphQL) of a file format (e.g., text documents, media files, and/or other file types). In certain implementations, a source code generator may consume each of the specifications and may then determine an appropriate data model class hierarchy. Similar structures and/or components across multiple specifications may be combined (with any property variations isolated in specification specific sub-classes) into groups such that source code patterns may be properly generated from a unified model. In most implementations, there may be one implementation per model class, even if that model class has multiple sub-classes per specification/version. In various implementations, a class hierarchy may include a common base class (e.g. a node) for data models for each specification (and version). In certain implementations, a shareable library and/or set of classes may be generated for implementation with other applications utilizing one or more specifications used to define a unified model.

Figure 3:
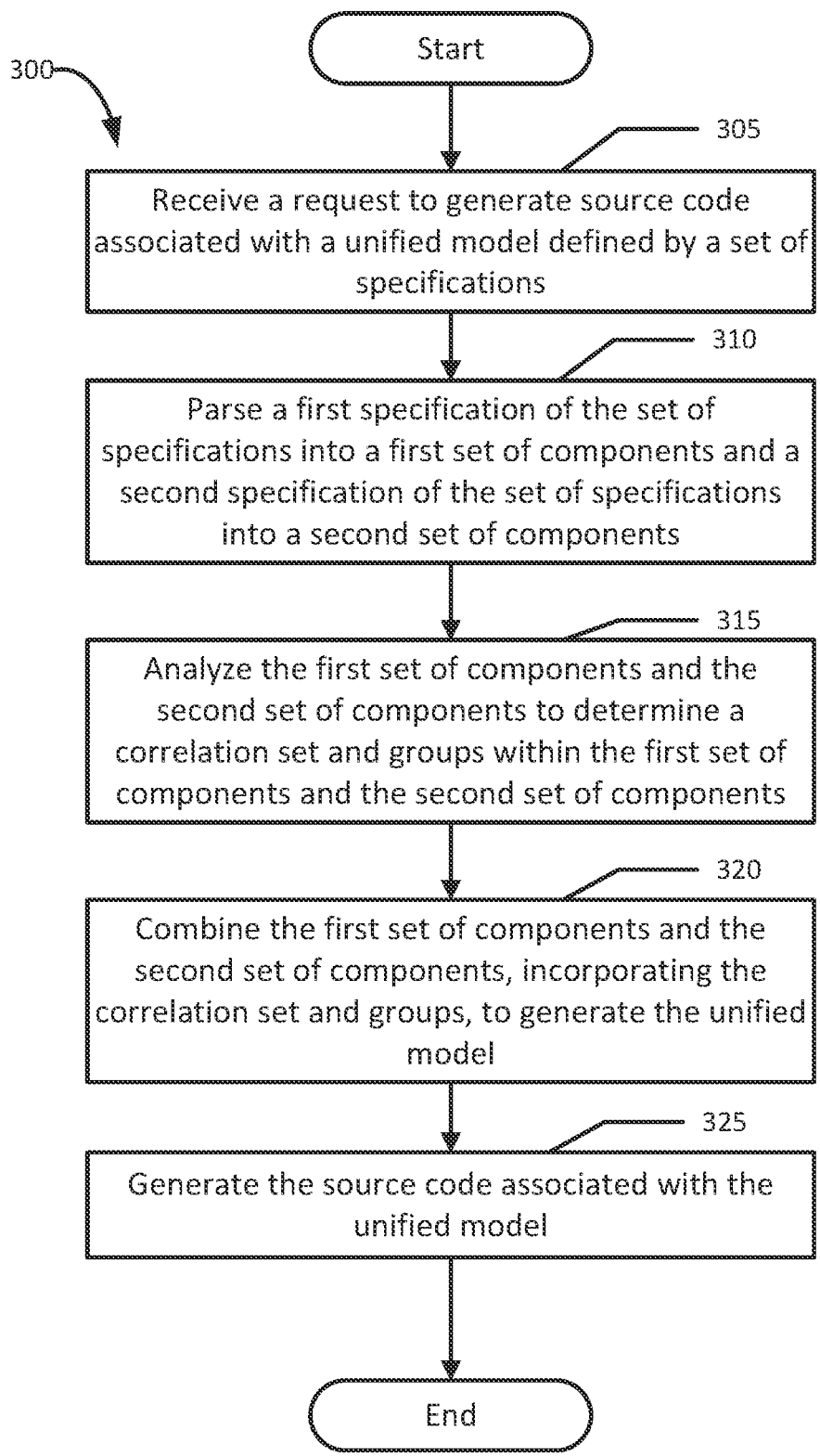
FIG. 3 illustrates a flowchart of an example method of generated source code associated with a unified model created from multiple specifications according to an example embodiment of the present disclosure.

FIG. 3 illustrates a flowchart of an example method of generating source code associated with a unified model created from multiple specifications, in accordance with an embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated and some of the blocks described are optional. The method 300 may be performed by processing logic that may comprise hardware (circuitry, dedicated logic, etc.), software, or a combination of both.

As shown in FIG. 3, an example method 300 may begin with receiving a request to generate source code associated with a unified model defined by a set of specifications (block 305). In an implementation, a source code generator 182 located on a server 180 may receive a request 160 to generate source code associated with an interface 172 and unified model 170 defined by a set of specifications 162. For example, an application (e.g., application 198A) may need an ability to support multiple file formats (e.g., specifications 166 or set of specifications 162) where there may be multiple versions of each file format. To support each file format and each version of each file format, source code for a unified model (e.g., unified model 170), and an associated interface (e.g., interface 172), may be created by a source code generator (e.g., source code generator 182) to interact and/or manipulate each file type and each version of each file type. In various implementations, a file format and/or file type may be a text file with specific semantics and syntax such as, but not limited to, a xml file, doc file, and a wsdl file. Next, the example method 300 may include parsing a first specification of the set of specifications into a first set of components and a second specification of the set of specifications into a second set of components (block 310). In an implementation, the source code generator 182 parses a first specification (e.g, specification 205A) into a set of components (e.g., components 220A-E) and a second specification (e.g., specification 205B) into a second set of components (e.g., components 230A-G). In various implementations a component may be a data structure and/or variable included in a representation of a file defined by a specification.

Next, the example method 300 may include analyzing the first set of components and the second set of components to determine a correlation set and groups within the first set of components and the second set of components (block 315). For example, in one implementation, source code generator 182 analyzes components 220A-E and components 230A-G to determine a correlation set 245 and groups (e.g., groups 215A-B, groups 225A-C, and groups 235A-D). In various implementations, different specifications and/or different versions of specifications may include the same or similar components which may be included in a correlation set. In these implementations, multiple components that are the same or similar (e.g., component 220A and component 230A) are included within the correlation set (e.g., correlation set 245) and may be represented by a single component within a unified model (e.g., component 240B represents component 220A from specification 205A and component 230A from specification 205B). In various implementations, components that are associated with other components within a specification may be placed in a single group (e.g., components 220B-E are placed into group 215B and components 230B-F are placed into group 225B). For example, in one implementation, an application (e.g., application 198A) may be a word processor operable to edit multiple versions of a same type of file (e.g., different versions of a word document, different versions of an excel file, and different versions of configuration files). In this implementation, each version may be associated with a different specification (e.g., specifications 166) where each version of a specification differs in small ways (e.g., additional entities, properties, and/or items removed from the specification). Generating a model enabled to operate on each version of each type of file streamlines and consolidates how each file type may be treated by the application. In some implementations, analyzing may include combining associated matching components in a correlation set into groups, where each matching component included in the correlation set may be represented by a single component within a unified model. In other implementations, analyzing may include correlating matching components from a first set of components with a second set of components into a correlation set.

Next, the example method 300 may include combining the first set of components and the second set of components, incorporating the correlation set and groups, to generate the unified model (block 320). For example, in one implementation, source code generator 182 may combine model 210A and model 210B using correlation set 245 to generate the unified model 210C. In this implementation, source code generator 182 creates group 235D because component 230F of group 225B does not correspond to any component in group 215B. Next, the example method 300 may include generating the source code associated with the unified model (block 325). For example, in one implementation, a source code generator 182 generates source code corresponding to and associated with the unified model 210C (e.g., unified model 170 and interface 172). In various implementations, source code may include a hierarchy or classes (e.g., java classes) representing a unified model (e.g., unified model 170) and associated interfaces (e.g., interface 172). In many implementations, interfaces may include visitor interface classes, traverser interfaces, input/output (I/O) classes (e.g., readers and writers). In many implementations, a source code generator may simplify versioning and/or upgrading of an application by replacing versioning a plurality of classes and sub-classes representing one or more uniform models with versioning a plurality of specifications. In some implementations, a unified model (e.g., unified model 170) may include a hierarchical representation of components from each respective specification (e.g., set of specification 162).

In various implementations, more than two specifications may be analyzed. For example, in some implementations, a first specification, a second specification, and a third specification (e.g., set of specification 162) may be parsed into a first set of components, a second set of components, and a third set of components. In certain implementations, each set of components may be analyzed to determine a correlation set and groups with respect to a set of specifications (e.g., set of specifications 162). In various implementations, components from each specification may be combined to generate a unified model. Subsequently, in some implementations, source code may be generated from a unified model defined by the set of specifications (e.g., set of specifications 162).

Figure 4:
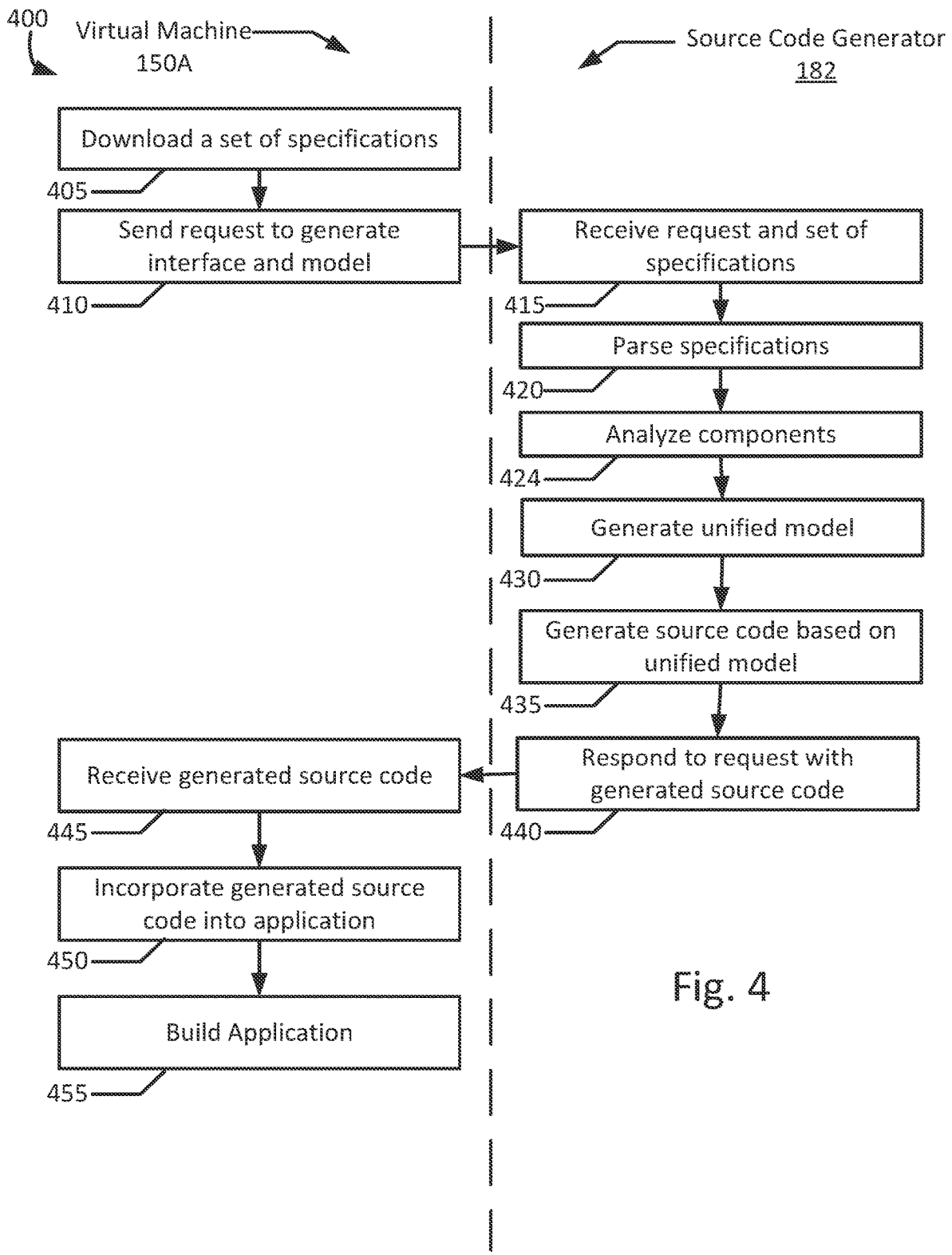
FIG. 4 illustrates a flow diagram of example methods of building an application including a unified model, in accordance with an embodiment of the present disclosure.

FIG. 4 illustrates a flow diagram of an example methods of building an application including a unified model, in accordance with an embodiment of the present disclosure. Although the example method 400 is described with reference to the flow diagram illustrated in FIG. 4, it will be appreciated that many other methods of performing the acts associated with the method 400 may be used. For example, the order of some of the blocks may be changed, certain blocks may be combined with other blocks, blocks may be repeated, and some of the blocks described are optional. For example, in the illustrated flow diagram, a virtual machine 150A is in communication with a source code generator 182 on a server 180 to generate a uniform model 170 and an interface 172 associated with the uniform model 170.

As shown in FIG. 4, virtual machine 150A downloads a set of specifications 162 (block 405) from specifications 166 stored on database 164. In various implementations, a database may be stored on a node (e.g., nodes 110A-C) or virtual machine (e.g., VM 150A-B). Virtual machine 150A sends a request 160 to source code generator 182 on server 180 to generate an interface 172 and uniform model 170 based on the set of specifications 162 (block 410). Upon receiving the request 160 and the set of specifications 162 (block 415), the source code generator 182 parses each of the set of specifications 162 to determine each component (e.g., components 220A-E and components 225A-G) defined within each specification (block 420). Next, the source code generator 182 analyzes each of the components (e.g., components 220A-E and components 225A-G) to determine a class hierarchy of the uniform model 170 (block 424). The source code generator 182 then generates a unified model 170 based on the class hierarchy (block 430). The source code generator 182 generates source code based on a class hierarchy of the uniform model and template classes.

Next, the source code generator 182 responds to the request 160 with the generated source code (e.g., unified model 170 and interface 172) (block 440). Once receiving generated source code (block 445), the VM 150A incorporates the generated source code into the application 198A (block 450) and builds the application 198A (block 455). For example, in one implementation, generated source code (e.g., unified model 170 and interface 172) may be a shared library that is linked with an application (e.g., application 198A). In an alternate implementation, generated source code (e.g., unified model 170 and interface 172) may be a shared library that is accessed during runtime. In some implementations, generated source code (e.g., unified model 170 and interface 172) may include reader and writer classes for the unified model (e.g., unified model 170). In other implementations, generated source code (e.g., unified model 170 and interface 172) may include input and output classes for each specification analyzed by the source code generator (e.g., source code generator 182).

In many implementations, an application implementing generated source code may be operable to generate a model defined by a set of specifications (e.g., a first specification and a second specification). In various implementations, an application implementing generated source code associated with a set of specifications (e.g., a first specification and a second specification) may be operable to create and/or convert a model from a first specification to a second specification.

Figure 5:
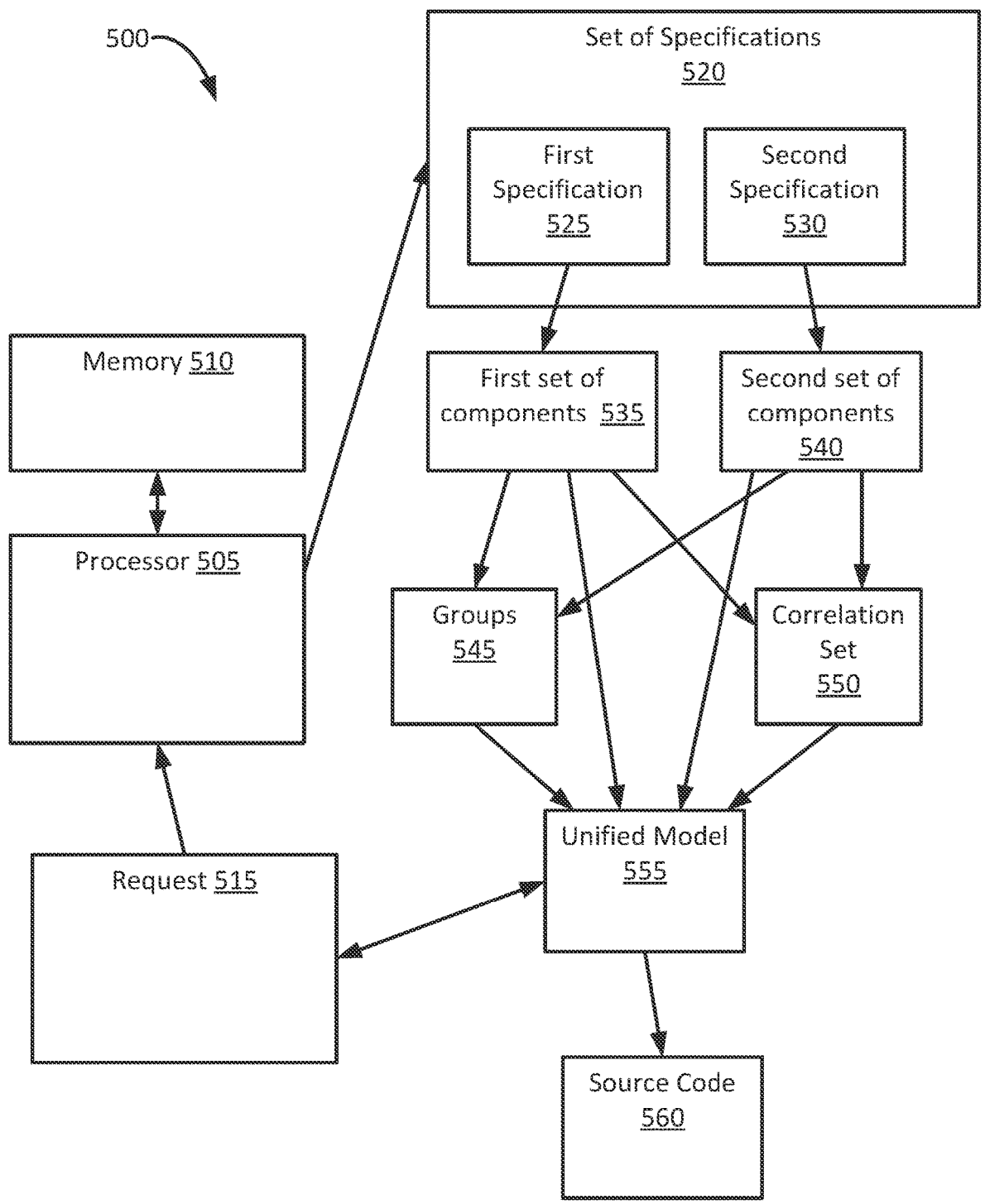
FIG. 5 illustrates a block diagram of an example system for generating source code according to an example embodiment of the present disclosure.

FIG. 5 is a block diagram of system 500 which includes memory 510 and processor 505. The processor 505 is in communication with the memory 510. The processor 505 is configured to receive a request 515 to generate source code 560 associated with a unified model 555 defined by a set of specifications 520. A first specification 525 of the set of specification 520 is parsed into a first set of components 535 and a second specification 530 of the set of specifications 520 is parsed into a second set of components 540. The first set of components 535 and the second set of components 540 are analyzed to determine a correlation set 550 and groups 545 within the first set of components 535 and the second set of components 540. The first set of components 535 and the second set of components 540, incorporating the correlation set 550 and groups 545, are combined to generate the unified model 555. The source code 560 associated with the unified model 555 is generated.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A system, comprising:
a memory; and
a processor in communication with the memory, wherein the processor is configured to:
receive a request to generate source code associated with a unified model defined by a set of specifications;
parse a first specification of the set of specifications into a first set of components and a second specification of the set of specifications into a second set of components;
analyze the first set of components and the second set of components to determine a correlation set and groups within the first set of components and the second set of components;
combine the first set of components and the second set of components, incorporating the correlation set and groups, to generate the unified model, which includes a common base class and a plurality of sub-classes, each sub-class including at least one component, wherein at least one sub-class includes one or more components that each respectively represent a component from each of the first set of components and the second set of components, and at least one sub-class includes a component different from each component in at least one set of components; and
generate the source code associated with the unified model, wherein
the generated source code is integrated within an application, which is operable to generate a model defined by the first specification or the second specification, and
the application is operable to convert the model from the first specification to the second specification and operable to convert the model from the second specification to the first specification.

2. The system of claim 1, wherein the generated source code includes classes representing the unified model.

3. The system of claim 1, wherein the generated source code includes reader and writer classes for the unified model.

4. The system of claim 1, wherein the generated source code includes input and output classes for the first specification and the second specification.

5. The system of claim 1, wherein the unified model includes a hierarchical representation of the first set of components and the second set of the components.

6. The system of claim 1, wherein analyzing comprises correlating matching components from the first set of components with the second set of components into the correlation set.

7. The system of claim 6, wherein analyzing further comprises combining associated matching components in the correlation set into groups, wherein each matching component included in the correlation set is represented by a single component within the unified model.

8. The system of claim 1, wherein the first specification is a different version of the second specification.

9. The system of claim 1, wherein the processor is further configured to:
parse a third specification of the set of specifications into a third set of components;
analyze the third set of components with respect to the first set of components and the second set of components to determine an updated correlation set and updated groups;
combine the first set of components, the second set of components, and the third set of components, incorporating the updated correlation set and the updated groups, to generate an updated unified model; and
generate the source code associated with the unified model.

10. A method, comprising:
- receiving a request to generate source code associated with a unified model defined by a set of specifications;
- parsing a first specification of the set of specifications into a first set of components and a second specification of the set of specifications into a second set of components;
- analyzing the first set of components and the second set of components to determine a correlation set and groups within the first set of components and the second set of components;
- combining the first set of components and the second set of components, incorporating the correlation set and groups, to generate the unified model, which includes a common base class and a plurality of sub-classes, each sub-class including at least one component, wherein at least one sub-class includes one or more components that each respectively represent a component from each of the first set of components and the second set of components, and at least one sub-class includes a component different from each component in at least one set of components; and
- generating the source code associated with the unified model, such that the generated source code is integrated within an application, which is operable to generate a model defined by the first specification or the second specification,
- wherein the application is operable to convert the model from the first specification to the second specification and operable to convert the model from the second specification to the first specification.

11. The method of claim 10, wherein the generated source code includes classes representing the unified model.

12. The method of claim 10, wherein the generated source code includes reader and writer classes for the unified model.

13. The method of claim 10, wherein the generated source code includes input and output classes for the first specification and the second specification.

14. A non-transitory machine readable medium storing code, which when executed by a processor is configured to:
- receive a request to generate source code associated with a unified model defined by a set of specifications;
- parse a first specification of the set of specifications into a first set of components and a second specification of the set of specifications into a second set of components;
- analyze the first set of components and the second set of components to determine a correlation set and groups within the first set of components and the second set of components;
- combine the first set of components and the second set of components, incorporating the correlation set and groups, to generate the unified model, which includes a common base class and a plurality of sub-classes, each sub-class including at least one component, wherein at least one sub-class includes one or more components that each respectively represent a component from each of the first set of components and the second set of components, and at least one sub-class includes a component different from each component in at least one set of components; and
- generate the source code associated with the unified model, such that the generated source code is integrated within an application, which is operable to generate a model defined by the first specification or the second specification,
- wherein the application is operable to convert the model from the first specification to the second specification and operable to convert the model from the second specification to the first specification.

15. The non-transitory machine readable medium of claim 14, wherein analyzing comprises correlating matching components from the first set of components with the second set of components into the correlation set.

16. The non-transitory machine readable medium of claim 15, wherein analyzing further comprises combining associated matching components in the correlation set into groups, wherein each matching component included in the correlation set is represented by a single component within the unified model.

17. The non-transitory machine readable medium of claim 14, wherein the processor is further configured to:
- parse a third specification of the set of specifications into a third set of components;
- analyze the third set of components with respect to the first set of components and the second set of components to determine an updated correlation set and updated groups;
- combine the first set of components, the second set of components, and the third set of components, incorporating the updated correlation set and the updated groups, to generate an updated unified model; and
- generate the source code associated with the unified model.

* * * * *